United States Patent
Rikhof

(10) Patent No.: US 7,448,683 B2
(45) Date of Patent: Nov. 11, 2008

(54) CHILD VEHICLE SEAT WITH IMPROVED MOUNTING SYSTEM

(75) Inventor: Johannes Hendrikus Rikhof, Beuningen (NL)

(73) Assignee: HTS Hans Torgersen AS, Kroderen (NO)

( * ) Notice: Subject to any disclaimer, the term of this patent is extended or adjusted under 35 U.S.C. 154(b) by 170 days.

(21) Appl. No.: 10/482,894

(22) PCT Filed: Jul. 11, 2002

(86) PCT No.: PCT/NO02/00258

§ 371 (c)(1), (2), (4) Date: Mar. 1, 2004

(87) PCT Pub. No.: WO03/008226

PCT Pub. Date: Jan. 30, 2003

(65) Prior Publication Data

US 2005/0035635 A1 Feb. 17, 2005

(30) Foreign Application Priority Data

Jul. 18, 2001 (NO) .................................. 2001-3564

(51) Int. Cl.
*A47D 1/00* (2006.01)
(52) U.S. Cl. .................................................. 297/250.1
(58) Field of Classification Search ............. 297/250.1, 297/484, 256.16, 256.17, 254
See application file for complete search history.

(56) References Cited

U.S. PATENT DOCUMENTS

| | | | | |
|---|---|---|---|---|
| 3,992,056 A | * | 11/1976 | Koziatek et al. | 297/256.13 |
| 4,685,741 A | * | 8/1987 | Tsuge et al. | 297/467 |
| 4,790,601 A | * | 12/1988 | Burleigh et al. | 297/484 |
| 5,385,386 A | * | 1/1995 | Beamish et al. | 297/256.16 |
| 5,630,645 A | * | 5/1997 | Lumley et al. | 297/250.1 |
| 5,779,320 A | * | 7/1998 | Corrales | 297/487 |
| 5,829,834 A | * | 11/1998 | Silverman | 297/250.1 |
| 5,982,393 A | | 11/1999 | Forchheimer | |
| 6,336,682 B1 | * | 1/2002 | Rosko | 297/483 |
| 6,419,316 B1 | | 7/2002 | Bergenheim | |

FOREIGN PATENT DOCUMENTS

| | | |
|---|---|---|
| DE | 4140638 | 6/1993 |
| EP | 0779175 | 6/1997 |
| EP | 0967113 | 12/1999 |
| FR | 2699469 A1 * | 6/1994 |
| FR | 2745535 | 9/1997 |
| NL | 9400114 | 9/1995 |
| SE | 502483 | 10/1995 |
| SE | 502485 | 10/1995 |
| SE | 512610 | 4/2000 |
| SE | 512317 | 12/2000 |

* cited by examiner

Primary Examiner—Milton Nelson, Jr.
(74) Attorney, Agent, or Firm—Christian D. Abel

(57) ABSTRACT

A child's vehicle seat with an improved mounting system (1), where a seat belt (2) is employed for attaching a child's seat. A first portion (3) of the seat belt is positioned substantially horizontally over a forwardly facing portion of the child seat's backrest (4). The child seat's backrest (4) has receiving portions for receiving the seat belt's first portion (3). The mounting system is further characterised in that a second portion (5) of the seat belt is positioned substantially horizontally over or under a forwardly facing part of the child seat's sitting portion (6).

3 Claims, 2 Drawing Sheets

CHILD VEHICLE SEAT WITH IMPROVED MOUNTING SYSTEM

The present invention relates to a mounting system for attaching a child's seat in a car and an adjustment device for adjusting the child seat's safety harness.

One of the most crucial safety factors when transporting children by car is the attachment of the child's seat to the car seat. There are currently a number of different ways of implementing this attachment. Many of these attachment methods involve operational steps that are felt by the user to be unnecessarily complicated. Many of the known attachment devices also have the potential for improvement purely from the safety point of view.

During user tests of child's seats it has been shown that the attachment of the child's seat to the car seat is carried out incorrectly in a great many cases, and this misuse results in a reduction in safety. It is therefore an object of the invention to provide a simple method of attaching a child's seat to the car seat that is easy to check, so that it is easy for the user to ascertain whether the child's seat is correctly attached.

Various types of solutions are previously known for attaching a child's seat to the car seat both by means of an attachment procedure involving the seat belt in the car and by the use of separate mechanisms for attachment to the car seat.

The use is known of a number of different types of mechanisms for attaching the rear of the child's seat to the car seat. The rear of the child's seat may, for example, be provided with loop devices for mounting to the car seat. However, this is a highly impractical and cumbersome method of attaching the seat. When using devices that are mounted to the rear of the child's seat it is also difficult to check whether the child's seat is actually correctly attached.

In other known systems use is made of the actual seat belt, which is normally used by adult passengers, to mount the child's seat.

In publication DE 3703742 an example is disclosed of attachment of a child's seat by means of the seat belt. In this case the seat belt is fastened over the child's seat with a portion diagonally over the child's seat and the other portion horizontally over the central portion of the child's seat. In this system the seat belt serves two purposes; both to keep the child's seat in place in the car seat and to contribute towards strapping the child in safely. The system does not work satisfactorily from the safety point of view, since the child is not strapped into the child's seat by a five-point belt, but only kept in place by a horizontal barrier in addition to a part of the seat belt's diagonal portion.

When using child's seats, however, it may sometimes also be necessary to adjust the attachment of the child's safety harness to the child seat's backrest in relation to the child's shoulder height in a sitting position. This is an adjustment that is necessary when the child has grown or if the child's seat is used by several children of different sizes.

It is known in the prior art for the child's safety harness to be fixed to the backrest in through-going openings provided in the backrest. When the child's safety harness has to be adjusted with regard to height according to the prior art, the safety harness has to be removed from the opening concerned and reinserted through other openings in the backrest. This is a time-consuming method of adjusting the safety harness, and is manifestly far from user-friendly.

The present-day requirement for child's seats is that the forward movement to which the child should be exposed during braking should be limited to 55 cm. Tests have shown that by means of the present invention this distance is reduced to 48 cm. By means of the attachment system according to the present invention the remaining 7 cm can be exploited during braking, thus reducing the possibility of the child being subjected to severe forces and stresses in the neck and head area.

The attachment system according to the invention will be felt to be user-friendly since all the attachment of the child's seat is carried out in a simple manner on the front of the child's seat. Compared with known attachment systems where the actual attachment takes place at the back of the child's seat, this method of mounting the child's seat will be perceived as easy to perform. In addition it is an advantage that it is easy to ensure that the child's seat is actually secured, since only a glance is required to check whether the child's seat is secured by the seat belt.

The mounting system for the child's seat according to a preferred embodiment of the invention employs the car's three-point seat belts. The child's seat is placed in the car seat and the seat belt is over the child seat's with a first portion of the seat belt being positioned horizontally over the forwardly facing back support surface of the child's seat's backrest. A second portion of the seat belt is placed below the child seat's sitting portion, in contact with the front surface of a base on which the seat is mounted.

In a second application of the child's seat the seat belt located in the middle of the back seat can be placed below the child seat's sitting portion, while an extra harness or other suitable means is employed to ensure that the child seat's backrest is secured in a similar manner to that which is achieved by means of a three-point seat belt.

The child's seat may have different arrangements or devices to secure the seat belt in the above-mentioned horizontal positions.

For securing a first portion of the seat belt, in a preferred embodiment the child seat's backrest has L-shaped slots in the backrest's side portions. The seat belt is passed through the slot's opening until the width of the seat belt fills the lowest part of the slot and the seat belt achieves a horizontal positioning over the backrest. By means of this method of attaching the seat belt to the backrest, the object is achieved that the seat belt is placed approximately on a level with the part of the backrest that is closest to the car seat. By positioning the seat belt in this fashion, a stable and uniform attachment is achieved relative to the car seat. If the car seat belt is used in addition for attaching the child's seat, which is arranged so as to be self-tightening, the forward movement of the child's seat will be reduced to a minimum.

It may also be appropriate to have different designs for portions of the side supports for attaching the seat belt, such as cut-outs with a width corresponding to the width of the seat belt where the seat belt can be located and secured by, for example, articulated locking devices. There are a great many possibilities here with regard to different methods of positioning and securing the seat belt. It is therefore left to those who are skilled in the art to decide which design or device is best suited to the attachment of the seat belt to the backrest in each individual case.

In a preferred embodiment the seat belt's second portion is kept in position under the child seat's sitting portion by the seat belt being stretched over the child seat's base in the horizontal position. According to a preferred embodiment of the invention the base will slant inwards, while the sitting portion projects slightly out over the base, thereby forming a natural stopper for the seat belt's second portion. In those cases where the sitting portion does not project out over the base or if extra attachment devices are required for safety reasons, these can easily be attached to the base of the child's seat. The necessity for attachment devices is a matter to be decided by the expert in each individual case and several types of design of such attachment devices can be envisaged. It may also be appropriate to equip the base with a groove or a cutout that secures the second portion of the seat belt in the desired horizontal position.

For adjusting the child's safety harness the child seat's backrest is provided with through-going cutouts extending in the backrest's longitudinal direction and with a width corresponding substantially to the width of the child seat's safety harness. In an embodiment of the invention, the cutouts at the front of the backrest are covered by flexible cloth material, possibly with slots marking the adjustment device's fixed locking positions.

The rear of the child seat's backrest is designed with at least two projecting portions where in each portion there are provided respective locking grooves. The adjustment device is mounted between the projecting portions. According to a preferred embodiment of the invention the adjustment device may be equipped with lead devices, which are arranged in engagement with the projecting portions' locking grooves and which can be moved along them. The locking grooves may be designed in such a manner that there are individual portions of the locking grooves where the adjustment device can be securely locked preferably by means of its lead devices, or alternatively the locking grooves may be arranged in such a manner that the adjustment device can be securely locked along the entire length of the locking groove. This may be achieved, for example, by the portions that are arranged for locking being placed at short intervals or the locking groove being provided as a rail. The use may also be envisaged of VELCRO hook-and-loop fastener for locking the adjustment device in a fixed position.

According to the invention the adjustment device is designed with a support portion for the child's safety harnesses and a gripping portion that is used when moving the adjustment device in the locking grooves. The child's safety harnesses are passed through the backrest's through-going cut-outs and are passed on over the adjustment device's support portion, before the safety harness is passed on along the backrest and on towards the child seat's sitting portion.

When the safety harness's height over the child's shoulders has to be adjusted, only a simple movement is required to take hold of the adjustment device's gripping portion. The adjustment device is moved up or down the locking groove until the desired height is reached, whereupon the adjustment device is locked in the desired position in the locking groove.

The gripping portion may assume different forms and the gripping portion illustrated in the attached drawings is only an example of a type of design.

The adjustment device according to a preferred embodiment of the invention is designed in such a manner that the position/height of both the safety harnesses resting over the child's shoulder portion are adjusted simultaneously. If so desired, it will be possible to employ the adjustment device according to the invention for separate adjustment of the height of each of the safety harnesses.

The invention will now be described in greater detail with reference to the attached figures.

In the figure a child's seat 1 is illustrated that has to be employed during transport of a child by car. The child's seat 1 is placed in the car seat (not illustrated in the figure) either in front or back seats and a seat belt preferably of the three-point type is arranged over the front of the child's seat, as illustrated in FIG. 1.

In this fastened position a first portion 3 of the seat belt will extend substantially horizontally positioned over the child seat's backrest 4. As the figure illustrates, an attempt will be made to arrange the seat belt's 2 first portion 3 along a portion of the backrest's bottom 4' in order to obtain a uniform and stable attachment against the car seat. If for various reasons it proves to be difficult to arrange the seat belt's 2 first portion 3 in contact with the backrest's bottom 4', the first portion 3 is arranged as horizontally as possible over the child seat's backrest 4, but in this case often at a greater distance from the car seat.

Figure 1:
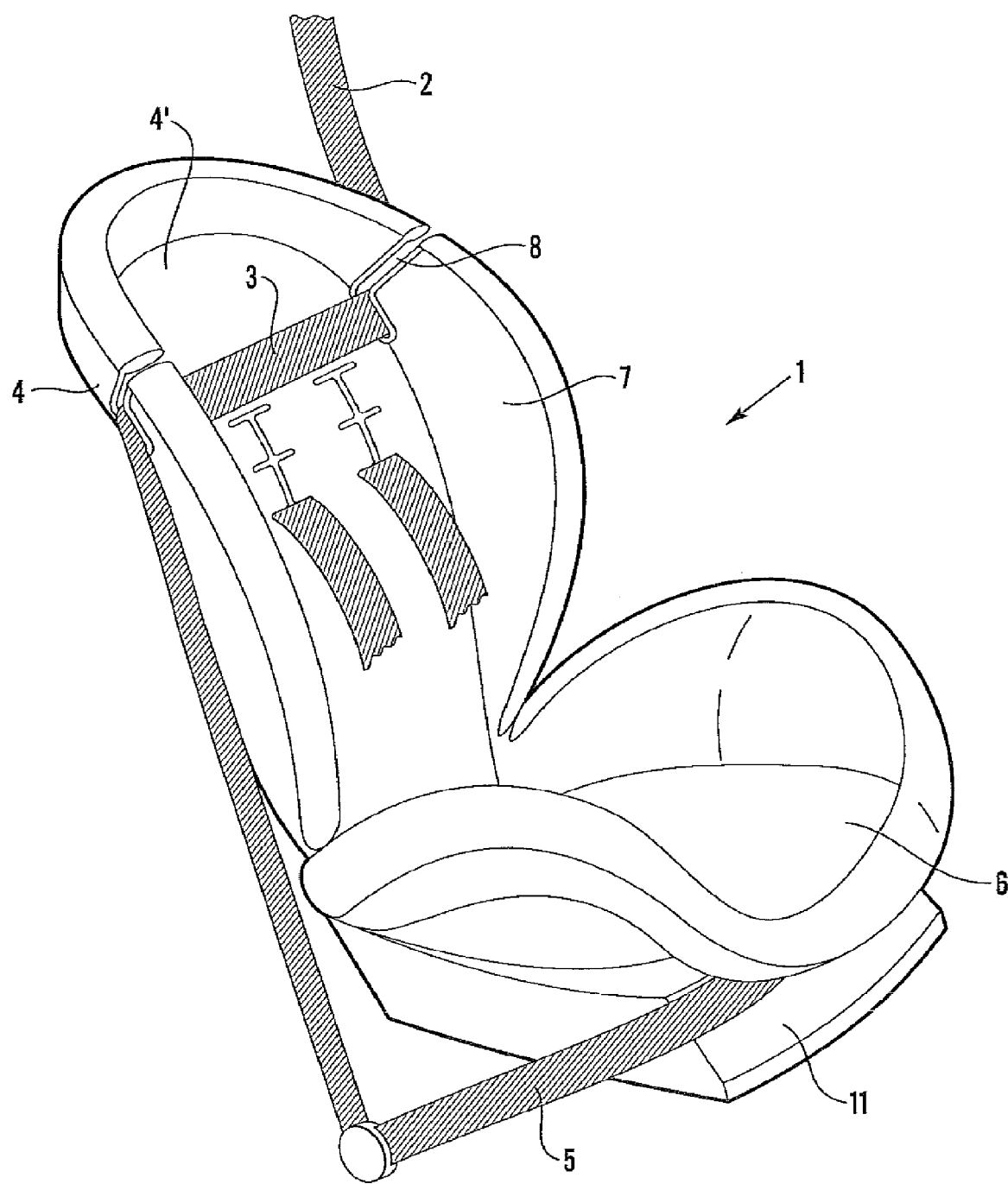
FIG. 1 is a perspective view of a child's seat illustrated attached by means of a three-point seat belt.
Figure 2:
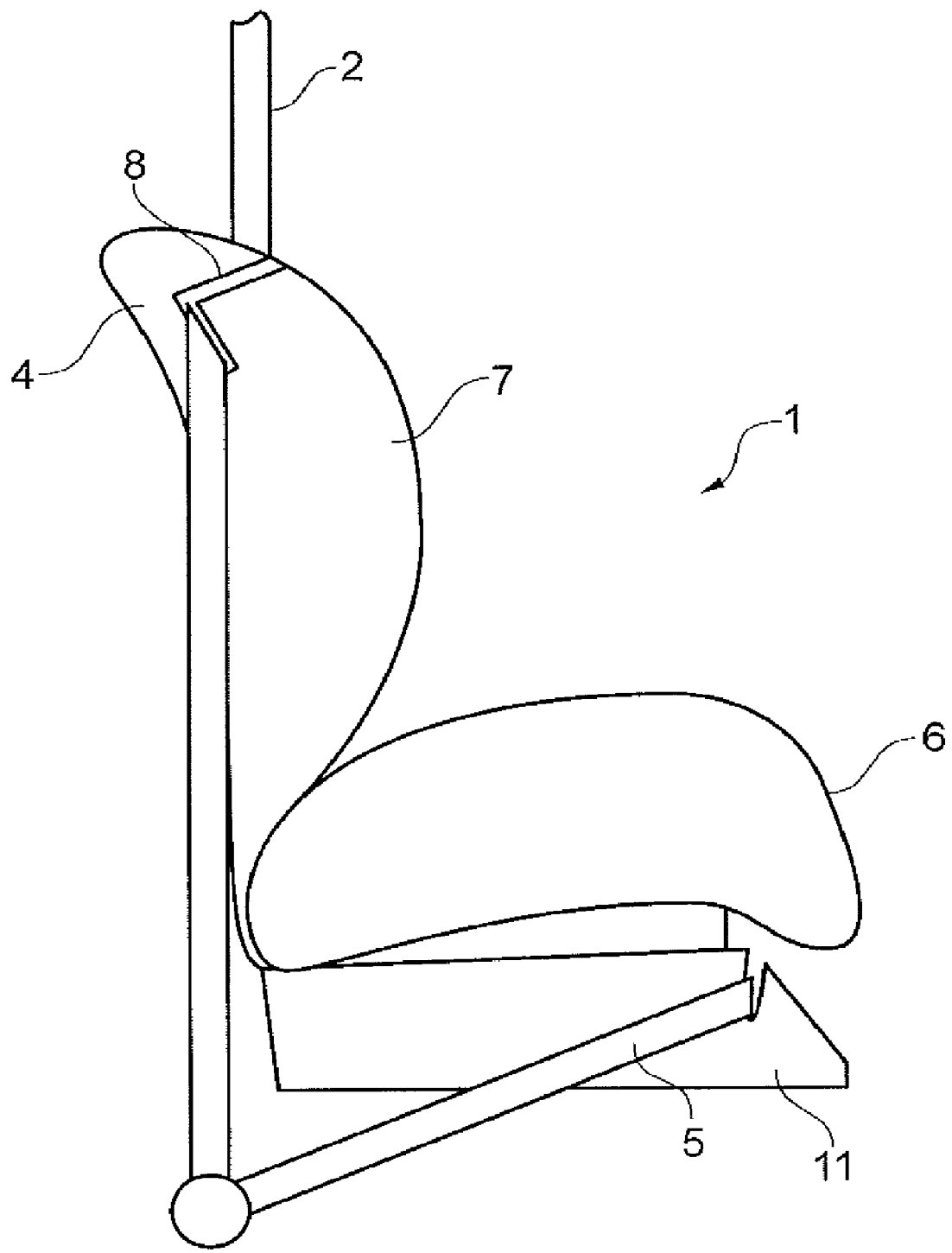
FIG. 2 is a perspective view of a second embodiment of the invention.

In FIG. 1 receiving portions are illustrated intended for receiving the first portion 3 of the seat belt. These receiving portions may be in the form of L-shaped slots 8 in the child seat's 1 side portion 7 as illustrated in the figure. The first portion 3 of the seat belt 2 can easily be inserted into the slot 8 and brought into substantially horizontally positioned abutment along the bottom 4 of the child seat's backrest 4.

When the child's seat is secured by the seat belt 2, in a preferred embodiment the seat belt's second portion 5 is arranged below the child seat's sitting portion 6. The second portion 5 of the seat belt 2 will preferably extend substantially horizontally positioned over the base 11 of the child's seat.

In a second embodiment of the invention the seat belt's second portion 5 may extend substantially horizontally positioned over the child seat's sitting portion 6, preferably over the lower area of the child seat's sitting portion 6. In the embodiment, the child seat's sitting portion 6 may be equipped with suitable arrangements or devices for receiving the seat belt's 2 second portion 5.

The invention claimed is:

1. A child vehicle seat for attachment in a vehicle having a three-point seat belt, comprising
   a. a backrest having a forwardly-facing back support surface, said backrest further comprising two side supports members that project forward from edges of the back rest,
   b. a sitting portion affixed to a base having a forward facing surface, said sitting portion having a front end that extends beyond the forward facing surface of the base, and
   c. an L-shaped slot arranged in each of the side support members, such that one leg of the L-shaped slot extends from the forward perimeter of its respective side support member to the level of the surface of the forwardly-facing back support surface, and further such that the other leg of the L-shaped slot extends downward toward the sitting portion,
   whereby a first portion of the three-point seatbelt can engage each of the L-shaped slots and a second portion of the three-point seatbelt can be arranged against the forward facing surface of the base under the front end of the sitting portion.

2. A child vehicle seat according to claim 1, wherein the forward facing surface of the base slants back in the direction of the back rest.

3. A child vehicle seat according to claim 2 wherein the forward facing surface of the base is provided with a groove for receiving the second portion of the seatbelt.

* * * * *